April 23, 1929.  E. PLATTEN  1,710,381
REFRIGERATING COUNTER
Filed Feb. 28, 1927  2 Sheets-Sheet 1
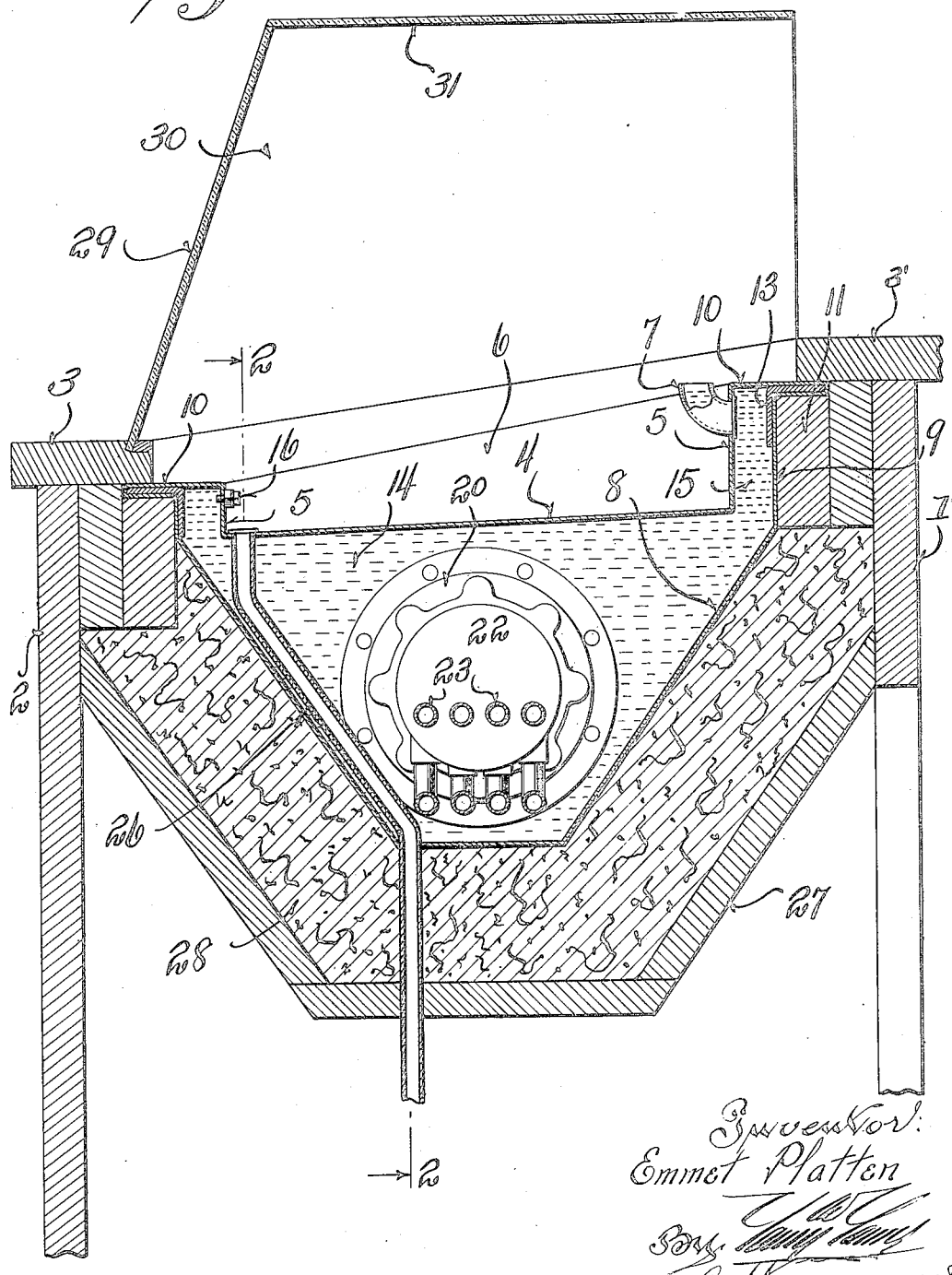

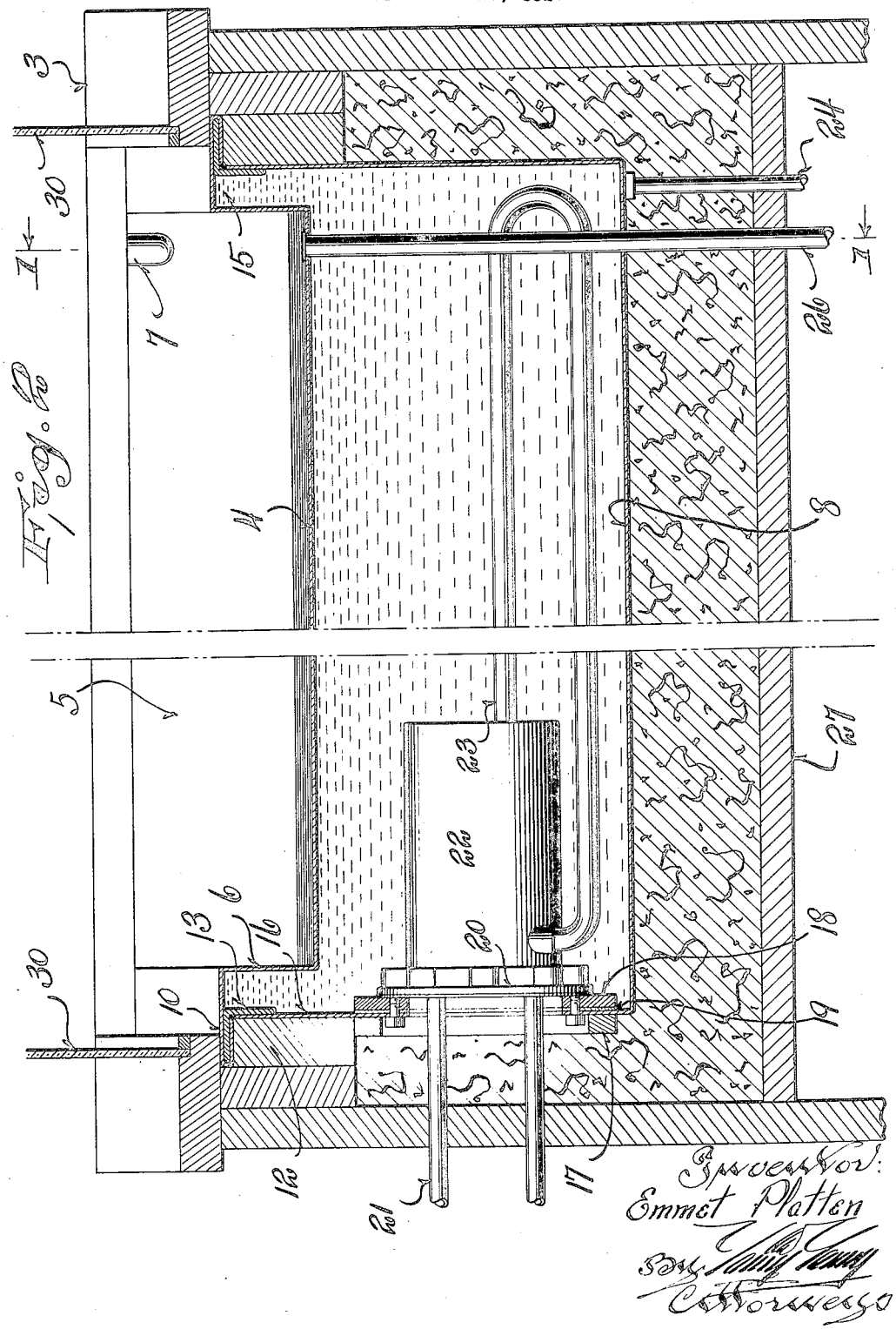

Patented Apr. 23, 1929.

1,710,381

UNITED STATES PATENT OFFICE.

EMMET PLATTEN, OF GREEN BAY, WISCONSIN.

REFRIGERATING COUNTER.

Application filed February 28, 1927. Serial No. 171,611.

This invention relates to a refrigerating counter.

This invention is an improvement over that disclosed in United States Patent No. 1,552,949, of September 8, 1925, for refrigerating counter, issued to W. J. Platten.

Objects of this invention are to provide a novel form of refrigerating counter in which the counter itself is the receptacle for the displayed food, such as meat, fish, and other articles, and in which the counter is formed of a metal having a high heat conductivity and non-corrosive characteristics.

Further objects are to provide a refrigerating counter which is so constructed that the food is chilled and maintained in a chilled condition by direct conduction, and in which there is no flowing stream of refrigerating air likely to condense moisture and cause wetting of the displayed material, but in which a bank of cold air is formed around the material which wholly encloses the displayed food and protects the food against flies and dust, and to provide a counter of channel construction which may be easily cleaned, which is self-draining and which will, therefore, take care of any liquid that may be spilled therein in the ordinary use of the apparatus.

Further objects are to provide a refrigerating counter in which an increased conducting surface is provided, which is very economical to operate and highly efficient, and which will receive and cooperate with standard refrigerating units.

An embodiment of the invention is shown in the accompanying drawings in which:

Figure 1 is a transverse sectional view through the counter, such view corresponding to a section on the line 1—1 of Figure 2;

Figure 2 is a sectional view on the line 2—2 of Figure 1.

Referring to the drawings, it will be seen that the counter comprises a pair of side supports 1 and 2 preferably formed of wood or similar material, and a top 3', also of wood. Preferably, the top 3' is extended rearwardly of the counter to provide a wrapping surface, and a front top portion 3 is provided at a lower level from the rear top portion. The main body of the counter consists of a channeled, non-corrosive metal member 4 having a high heat conductivity and provided with upturned sides 5 and upturned ends 6. Through one of the sides 5, an upwardly curved brine filling tube 7 is provided, as shown most clearly in Figure 1.

A second metal member 8 is formed also of channel shape and surrounds the channeled main member 4. This member 8, preferably has downwardly slanting side walls and upturned upper side portions 9. The walls 5 and the ends 6 of the member 4 are outwardly turned to provide flanges 10. The flanges 10 are secured to longitudinally extending supporting wooden beams or members 11 and transversely extending wooden members 12, as shown in Figures 1 and 2, respectfully. The flanges 9 are also secured to these members, preferably to their vertical faces in any suitable manner. Further, it is to be noted that reenforcing angle strips 13 are provided about which the flanges 10 are wrapped. If desired, this portion of the apparatus may be brazed, soldered, or welded, or otherwise secured to provide a rigid unit. Under these conditions, the flanges 9 need not be attached to the members 11, as they will be carried by the reenforced angular corner portions, described above, and such corner portions will then rest upon the supporting members 11 and 12.

A space 14 is left, as indicated in Figures 1 and 2, between the members 4 and 8, and such space opens upwardly into the side or marginal spaces 15. These spaces are all filled with brine through the filling pipe 7. A vent plug or vent valve 16 is provided in one of the vertical walls 5 to aid in letting out any trapped air when the brine is being poured into the apparatus through the filling pipe 7. It is to be noted also from Figure 1, that the filling pipe has its upper end located above the uppermost portion of the brine space 15, so that such space may be filled without danger of overflowing the pipe 7.

One of the end walls, for example, the wall indicated by the reference character 16 in Figure 2, is provided with a reenforcement in the form of two metal rings 17 and 18. One of the rings, for example, 18, extends inwardly and is provided with a gasket 19 between itself and the wall 16. The flange 20 of a standard refrigerating unit is bolted to the ring 18, as shown in Figure 2, to thus rigidly hold the unit in place, suitable pipes 21 leading outwardly for supplying the unit. This unit may comprise a drum 22 and a plurality of pipes 23.

It is to be noted also that the lower portion of the brine tank is provided with a drain 24 which is normally closed by a cap 25.

Further, it is to be noted that the channeled counter portion 4 slants downwardly and forwardly and is provided with a drain pipe 26 at its lowest portion, such drain pipe passing downwardly within the space 14 and outwardly from the apparatus, as shown.

A wood trough-like member 27 is carried by the main supports, as shown in Figure 1, and is spaced from the bottom of the brine tank. The space between the supports is filled with a high grade of insulation, such as cork, as indicated by the reference character 28. It is to be noted also that a plurality of thicknesses of wood are provided between the vertical walls of the brine tank and the outer air adjacent the upper ends of the brine tank. If desired, additional insulation may be placed at this portion, although the wood itself acts as an insulator, particularly as it is formed of a plurality of separate strips.

The counter is provided with a glass cover having a front rearwardly slanting portion 29, end portions 30, and a top portion 31, so that the food is freely displayed while it rests within the channeled portion 4 of the counter. The rear of this cover is preferably open, particularly when quick and substantially continuous service is desired, so that the articles may be freely removed from the counter without opening doors. However, it is within the scope of this invention to provide doors for the open rear portion of the counter.

It is to be noted that the articles of food are placed directly in contact with the channeled metal portion of the counter and are maintained cool by direct conduction.

Further, it is to be noted that a blanket of cold air envelopes the food and due to the sunken or depressed formation of the counter, is retained over the food. The placing of food in the counter and the removal therefrom does not disturb the air to any material degree, as the heavy chilled air tends to remain in the sunken portion of the counter.

It is also intended that this device be used for window display purposes, if desired.

It is to be noted also that the device can be readily kept in a highly sanitary condition, as the counter is freely accessible from the rear from one end to the other thereof, and may be very readily cleaned. The water used in cleaning the counter will freely drain through the pipe 26. The counter may thus be scrubbed and rinsed with the utmost facility.

Further, the counter is so constructed that a minimum number of pipes project therefrom and, consequently, it may be most easily installed.

From actual practice with this counter, it has been found that it presents a highly attractive appearance, is easily kept in a sanitary condition and also keeps the food thoroughly chilled and freely accessible.

Although the invention has been described in considerable detail, such description is intended as illustrative rather than limiting as the invention may be variously embodied and as the scope of such invention is to be determined as claimed.

I claim:

1. A refrigerating counter comprising a permanently positioned, depressed channeled portion for the direct reception of articles to be chilled, a second channeled member located below said first mentioned channeled member and forming therewith a liquid receiving compartment, and a refrigerating unit located within said compartment, whereby a quiet blanket of dense chilled air is formed in the depressed portion.

2. A refrigerating counter comprising a permanently positioned, depressed channeled member adapted to directly receive food, a second channeled member surrounding the side and bottom portion of said first mentioned channeled member and forming therewith a liquid compartment, a liquid filling said compartment and contacting directly with the bottom and side walls of said first mentioned channeled member, a refrigerating element located within the liquid compartment, and insulation surrounding the bottom and side portions of said second channeled member, whereby said first mentioned channeled member contacts at its sides and bottom with the chilling liquid, whereby a quiet blanket of dense chilled air is formed in the depressed portion.

3. A refrigerating counter comprising a permanently positioned, depressed channeled member adapted to directly receive food, a second channeled member surrounding the side and bottom portion of said first mentioned channeled member and forming therewith a liquid compartment, a liquid filling said compartment and contacting directly with the bottom and side walls of said first mentioned channeled member, a refrigerating element located within the liquid compartment, insulation surrounding the bottom and side portions of said second channeled member, whereby said first mentioned channeled member contacts at its sides and bottom with the chilling liquid, and a drain pipe leading from said first mentioned channeled member, whereby a quiet blanket of dense, chilled air is formed in the first mentioned channeled member.

4. A refrigerating counter comprising a permanently positioned, depressed channeled portion for the direct reception of articles to be chilled, a second channeled member located below said first mentioned channeled member and forming therewith a liquid receiving compartment, a refrigerating unit located within said compartment, and a cover for said counter having a transparent portion through which the said articles may be viewed, whereby a quiet blanket of dense chilled air is formed in the depressed portion, said cover preventing transverse currents of air from sweeping away the chilled, dense air.

5. A refrigerating counter comprising a permanently positioned depressed channeled member adapted to directly receive food, a second channeled member surrounding the side and bottom portion of said first mentioned channeled member and forming therewith a liquid compartment, a liquid filling said compartment and contacting directly with the bottom and side walls of said first mentioned channeled member, a refrigerating element located within the liquid compartment, insulation surrounding the bottom and side portions of said second channeled member, whereby said first mentioned channeled member contacts at its sides and bottom with the chilling liquid, and a transparent cover for said counter, said cover having a top, front, and end walls, whereby a quiet blanket of dense chilled air is formed in the depressed portion, said cover preventing transverse currents of air from sweeping away the chilled, dense air.

6. A refrigerating counter comprising side frame members, a brine compartment suspended from said side frame members and having a recessed upper portion for directly receiving articles of food, a refrigerating member carried within said compartment for chilling the brine, a channeled insulating member surrounding the brine compartment on its bottom and sides, and a transparent cover over said recessed upper portion, said cover providing access to the articles of food, whereby a quiet blanket of dense chilled air is formed in the depressed portion, said cover preventing transverse currents of air from sweeping away the chilled, dense air.

7. A refrigerating counter comprising side frame members, a brine compartment suspended from said side frame members and having a recessed upper portion for directly receiving articles of food, a refrigerating member carried within said compartment for chilling the brine, a channeled insulating member surrounding the brine compartment on its bottom and sides, and a transparent cover over said recessed upper portion, said cover having a front, end walls and a top and providing access to the articles of food from its rear, whereby a quiet blanket of dense chilled air is formed in the depressed portion, said cover preventing transverse currents of air from sweeping away the chilled, dense air.

8. A refrigerating counter comprising an upper portion, a depressed portion extending downwardly therefrom and adapted to directly receive food, a refrigerating device positioned below the depressed portion and adapted to remove heat from the depressed portion by conduction, said depressed portion being adapted to collect chilled, dense air, and a cover projecting upwardly from said upper portion and surrounding the major part of the depressed portion, whereby the depressed portion is shielded from transverse currents of air, whereby a quiet blanket of dense chilled air is formed in the depressed portion.

In testimony that I claim the foregoing I have hereunto set my hand at Green Bay, in the county of Brown and State of Wisconsin.

EMMET PLATTEN.